(12) United States Patent
Kim et al.

(10) Patent No.: US 12,158,336 B2
(45) Date of Patent: Dec. 3, 2024

(54) BATTERY SWELLING INSPECTION APPARATUS

(71) Applicant: LG ENERGY SOLUTION, LTD., Seoul (KR)

(72) Inventors: Do-Yul Kim, Daejeon (KR); Dong-Wan Ko, Daejeon (KR); Ki-Young Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 272 days.

(21) Appl. No.: 17/789,108

(22) PCT Filed: Mar. 3, 2021

(86) PCT No.: PCT/KR2021/002633
§ 371 (c)(1),
(2) Date: Jun. 24, 2022

(87) PCT Pub. No.: WO2021/187777
PCT Pub. Date: Sep. 23, 2021

(65) Prior Publication Data
US 2023/0033916 A1 Feb. 2, 2023

(30) Foreign Application Priority Data
Mar. 20, 2020 (KR) .................. 10-2020-0034628

(51) Int. Cl.
*G01B 21/32* (2006.01)
*H01M 10/42* (2006.01)
*H01M 10/48* (2006.01)

(52) U.S. Cl.
CPC ........ *G01B 21/32* (2013.01); *H01M 10/4285* (2013.01); *H01M 10/48* (2013.01)

(58) Field of Classification Search
CPC .... G01B 21/32; H01M 10/4285; H01M 10/48
See application file for complete search history.

(56) References Cited

U.S. PATENT DOCUMENTS 11,867,668 B2 * 1/2024 Hoehl .................. G01B 21/045
2018/0261824 A1 * 9/2018 Ju .......................... H01M 10/48
(Continued)

FOREIGN PATENT DOCUMENTS

| CN | 106532156 A | 3/2017 |
| CN | 208157567 U | 11/2018 |

(Continued)

OTHER PUBLICATIONS

International Search Report for PCT/KR2021/002633 (PCT/ISA/210) mailed on Jun. 16, 2021.

*Primary Examiner* — Octavia Hollington
(74) *Attorney, Agent, or Firm* — Birch, Stewart, Kolasch & Birch, LLP

(57) ABSTRACT

Discussed is a battery swelling inspection apparatus including a first plate configured in a plate shape; a second plate configured in a plate shape and located to face the first plate; a fixing frame configured such that a portion of the first plate and a portion of the second plate are fixedly coupled thereto; a plurality of pressure measuring elements fixedly coupled to the first plate, having a head located to face the second plate, and configured to measure a pressure applied to the head, respectively; and a plurality of pressing members configured to have a second surface in a flat shape so that the second surface faces the second plate and have a first surface that is at least partially attached to the head of each of the plurality of pressure measuring elements.

18 Claims, 12 Drawing Sheets

(56) References Cited

U.S. PATENT DOCUMENTS

| | | |
|---|---|---|
| 2019/0094003 A1 | 3/2019 | Kim et al. |
| 2020/0158596 A1 | 5/2020 | Kim et al. |
| 2020/0203783 A1* | 6/2020 | Ringuette ............ G01R 31/392 |
| 2021/0197691 A1 | 7/2021 | Stefanopoulou et al. |
| 2023/0025923 A1* | 1/2023 | Ko ....................... G01R 31/392 |

FOREIGN PATENT DOCUMENTS

| | | | |
|---|---|---|---|
| KR | 10-2013-0003483 A | | 1/2013 |
| KR | 10-2017-0041538 A | | 4/2017 |
| KR | 10-2017-0042082 A | | 4/2017 |
| KR | 20170042082 A | * | 4/2017 |
| KR | 10-2018-0099668 A | | 9/2018 |
| KR | 10-2018-0136192 A | | 12/2018 |
| KR | 10-2019-0090291 A | | 8/2019 |
| KR | 10-1983849 B1 | | 9/2019 |
| KR | 10-2070684 B1 | | 1/2020 |

* cited by examiner

BATTERY SWELLING INSPECTION APPARATUS

TECHNICAL FIELD

The present application claims priority to Korean Patent Application No. 10-2020-0034628 filed on Mar. 20, 2020 in the Republic of Korea, the disclosures of which are incorporated herein by reference.

The present disclosure relates to a battery swelling inspection apparatus, and more particularly, to a battery swelling inspection apparatus capable of inspecting swelling of a battery cell.

BACKGROUND ART

Recently, the demand for portable electronic products such as notebook computers, video cameras and portable telephones has increased sharply, and electric vehicles, energy storage batteries, robots, satellites and the like have been developed in earnest. Accordingly, high-performance batteries allowing repeated charging and discharging are being actively studied.

Batteries commercially available at present include nickel-cadmium batteries, nickel hydrogen batteries, nickel-zinc batteries, lithium batteries and the like. Among them, the lithium batteries are in the limelight since they have almost no memory effect compared to nickel-based batteries and also have very low self-charging rate and high energy density.

Such a battery may cause swelling in which gas is generated in the battery during charging and discharging or in a high temperature state to inflate the battery. Since there is a risk of fire or explosion due to battery swelling, it is important to accurately inspect the swelling behavior of the battery.

Conventionally, a device for inspecting swelling of a battery using a plurality of load cells has been disclosed (Patent Document 1). Referring to Patent Document 1, a first plate, a plurality of load cells, a second plate, a measurement target (a battery cell) and a third plate are stacked, and the first plate, the second plate and the third plate are fixed using a plurality of fastening members. In particular, since the second plate provided between the battery cell and the plurality of load cells is fixed by the fastening member, there is inevitably much loss of the swelling pressure of each region of the battery cell transmitted to the plurality of load cells. That is, in Patent Document 1, since the movement of the second plate caused by the swelling pressure is restricted by the fastening member, there is a limitation in that the swelling of the battery cell may not be accurately inspected.

In addition, referring to FIG. 9 of Patent Document 1, a structure in which the second plate is composed of a plurality of partial flat plates and the partial flat plates are connected to each other by a connection unit is disclosed. Since the partial flat plates are connected to each other, there is a problem that the swelling pressure applied to one of the partial flat plates may affect the other partial flat plates.

In addition, the plurality of partial flat plates of Patent Document 1 are restricted to each other by the connecting unit made of a material having elasticity or ductility. That is, if a swelling pressure is applied to any one partial flat plate, the swelling pressure is not transmitted only to the load cell located in a lower direction, but is distributed through the connection unit.

Considering the above, there is a problem that the pressure of the battery cell measured by the battery cell pressure measuring device disclosed in Patent Document 1 may be inaccurate.

(Patent Document 1) KR 10-2017-0042082 A

DISCLOSURE

Technical Problem

The present disclosure is designed to solve the problems of the related art, and therefore the present disclosure is directed to providing a battery swelling inspection apparatus capable of independently measuring the pressure of each region of a battery cell corresponding to each of a plurality of pressure measuring elements.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery swelling inspection apparatus, comprising: a lower plate configured in a plate shape; an upper plate configured in a plate shape and located to face the lower plate; a fixing frame configured such that a portion of the lower plate and a portion of the upper plate are fixedly coupled thereto; a plurality of pressure measuring elements fixedly coupled to the lower plate, having a head located to face the upper plate, and configured to measure a pressure applied to the head, respectively; and a plurality of pressing members configured to have an upper surface in a flat shape so that the upper surface faces the upper plate and have a lower surface that is at least partially attached to the head of each of the plurality of pressure measuring elements.

The pressure measuring element may be configured such that at least a portion of the head is inclined.

The pressure measuring element may be configured such that at least a portion of the head has a curved surface.

The pressing member may be configured such that a center portion of the lower surface thereof is attached to the head.

The pressing member may be configured such that the upper surface thereof faces the upper plate at a predetermined interval.

The fixing frame may be configured such that the interval between the upper surface of the pressing member and the upper plate is adjustable.

The pressing member may include: a body portion configured in a plate shape having the upper surface and the lower surface; and a leg portion configured to protrude in a lower direction from at least a portion of the body portion.

The pressing member may be configured such that an angle between the body portion and the leg portion is changeable.

The leg portion may be coupled with at least a portion of the body portion and configured to enable hinge rotation thereat.

A battery swelling inspection apparatus according to another aspect of the present disclosure may further comprise an elastic member configured to have one end attached to the lower plate and the other end attached to the leg portion.

The body portion may be configured to be inclinable based on the head to correspond to a location where a pressure is applied.

The leg portion may be configured to be movable in an upper direction or in a lower direction by the elastic member that contracts or expands depending on the degree of inclination of the body portion.

A battery swelling inspection apparatus according to still another aspect of the present disclosure may further comprise a support member configured to have one end attached to the lower plate and have a hollow or a groove so that the leg portion is inserted therein.

The elastic member may be configured to be located in the hollow or the groove.

A battery swelling inspection apparatus according to still another aspect of the present disclosure may further comprise a guide member configured to protrude in an upper direction from an upper surface of the lower plate so that the upper surface of the lower plate is divided into a plurality of sections.

A battery swelling inspection apparatus according to still another aspect of the present disclosure may further comprise a control unit connected to the plurality of pressure measuring elements and configured to receive a measured pressure value from each of the plurality of pressure measuring elements and, when a battery cell is interposed between the upper plate and the pressing member, determine at least one of a swelling distribution of the battery cell and a swelling degree of each region of the battery cell based on the plurality of received pressure values.

Advantageous Effects

According to an aspect of the present disclosure, there is an advantage that the swelling distribution of the battery cell and/or the swelling degree of each region of the battery cell may be more accurately measured.

The effects of the present disclosure are not limited to the effects mentioned above, and other effects not mentioned will be clearly understood by those skilled in the art from the description of the claims.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Additionally, in describing the present disclosure, when it is deemed that a detailed description of relevant known elements or functions renders the key subject matter of the present disclosure ambiguous, the detailed description is omitted herein.

The terms including the ordinal number such as "first", "second" and the like, may be used to distinguish one element from another among various elements, but not intended to limit the elements by the terms.

Throughout the specification, when a portion is referred to as "comprising" or "including" any element, it means that the portion may include other elements further, without excluding other elements, unless specifically stated otherwise.

Furthermore, the term "control unit" described in the specification refers to a unit that processes at least one function or operation, and may be implemented by hardware, software, or a combination of hardware and software.

In addition, throughout the specification, when a portion is referred to as being "connected" to another portion, it is not limited to the case that they are "directly connected", but it also includes the case where they are "indirectly connected" with another element being interposed between them.

Hereinafter, preferred embodiments of the present disclosure will be described in detail with reference to the accompanying drawings.

Figure 1:
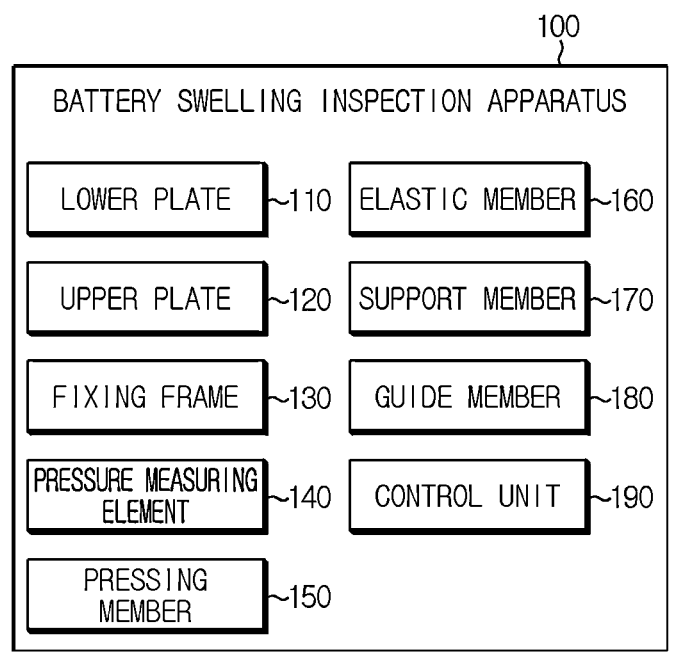
FIG. 1 is a block diagram schematically showing a battery swelling inspection apparatus according to an embodiment of the present disclosure.
Figure 2:
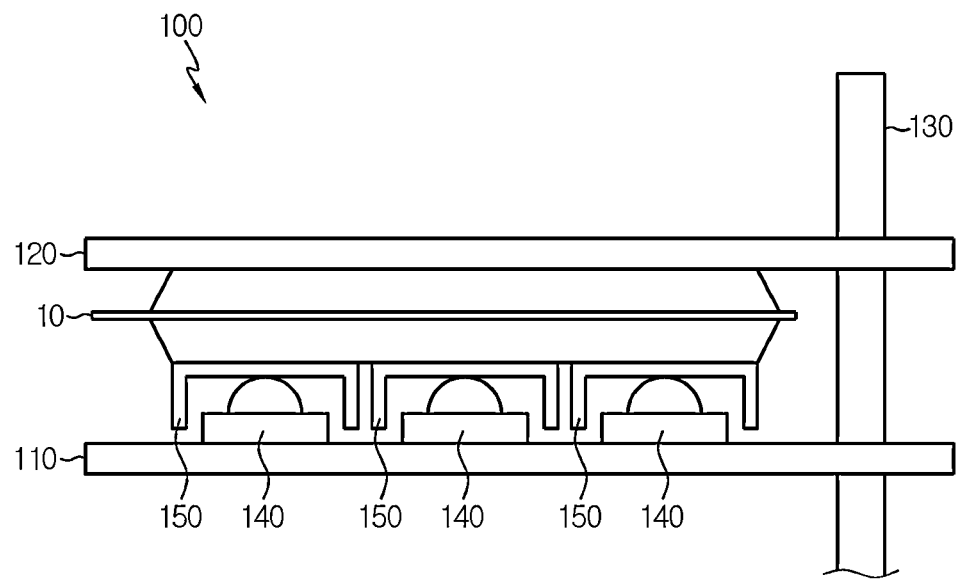
FIG. 2 is a diagram schematically showing the battery swelling inspection apparatus according to an embodiment of the present disclosure.

FIG. 1 is a block diagram schematically showing a battery swelling inspection apparatus 100 according to an embodiment of the present disclosure. FIG. 2 is a diagram schematically showing the battery swelling inspection apparatus 100 according to an embodiment of the present disclosure.

The battery swelling inspection apparatus 100 according to an embodiment of the present disclosure is a device for inspecting swelling of a battery cell 10, and may inspect a swelling distribution and/or a swelling degree.

Here, the battery cell 10 refers to one independent cell that has a negative electrode terminal and a positive electrode terminal and is physically separable. For example, one pouch-type lithium polymer cell may be regarded as a battery cell.

In general, battery swelling, in which the battery cell 10 is inflated, may occur not only at a center portion of the battery cell 10 but also at a peripheral portion thereof. Here, the peripheral portion refers to an area excluding the center portion. Accordingly, the battery swelling inspection apparatus 100 may inspect a pressure distribution (a swelling distribution) of the battery cell 10 caused by swelling and/or a pressure level (a swelling degree) of each region of the battery cell 10 caused by swelling.

Referring to FIGS. 1 and 2, the battery swelling inspection apparatus 100 according to an embodiment of the present disclosure may include a lower plate 110, an upper plate 120, a fixing frame 130, a pressure measuring element 140, and a pressing member 150.

The lower plate 110 may be configured in a plate shape.

Specifically, the lower plate 110 may be configured in a plate shape so that a plurality of pressure measuring elements 140 may be attached thereto. For example, in the embodiment of FIG. 2, the lower plate 110 may be configured in a flat plate shape.

The upper plate 120 may be configured in a plate shape and located to face the lower plate 110.

Specifically, the upper plate 120 may be configured in a flat plate shape so that a lower surface of the upper plate 120 contacts an upper surface of the battery cell 10.

Preferably, the upper plate 120 and the battery cell 10 may be attached and detached. For example, when swelling of the battery cell 10 is inspected, the upper surface of the battery cell 10 may be attached to the lower surface of upper plate 120. In addition, if the inspection of swelling of the battery cell 10 is finished, the battery cell 10 may be detached from the upper plate 120.

In addition, since the battery cell 10 is interposed between the upper plate 120 and the lower plate 110, the upper plate 120 and the lower plate 110 may be located to face each other.

For example, in the embodiment of FIG. 2, the upper plate 120 and the lower plate 110 are located to face each other, and the battery cell 10 may be provided between the upper plate 120 and the lower plate 110.

The fixing frame 130 may be configured such that a portion of the lower plate 110 and a portion of the upper plate 120 are fixedly coupled thereto.

Specifically, the fixing frame 130 may fix the upper plate 120 and the lower plate 110 so that the upper plate 120 and the lower plate 110 are not shaken or rotated.

The pressure measuring element 140 may be provided in plural. In addition, the plurality of pressure measuring elements 140 may be fixedly coupled to the lower plate 110.

Here, the number of the pressure measuring elements 140 included in the battery swelling inspection apparatus 100 is not limited. However, if a larger number of pressure measuring elements 140 are provided, the accuracy of the swelling inspection may be improved. Hereinafter, for convenience of description, it will be described that nine pressure measuring elements 140 are provided.

In addition, the plurality of pressure measuring elements 140 may be fixedly coupled to the lower plate 110 to be spaced apart from each other at a constant interval.

For example, if the plurality of pressure measuring elements 140 are biased and fixedly coupled to a portion of the lower plate 110, the swelling distribution of the battery cell 10 may not be accurately measured. Accordingly, the plurality of pressure measuring elements 140 may be disposed on the lower plate 110 at predetermined intervals.

The pressure measuring element 140 may be located so that a head 141 thereof faces the upper plate 120 and may be configured to measure a pressure applied to the head 141, respectively.

Figure 3:
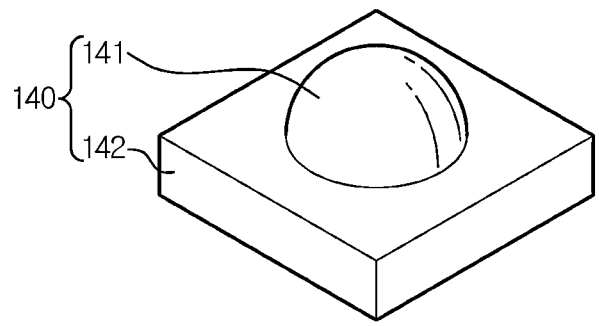
FIG. 3 is a diagram showing a pressure measuring element of the battery swelling inspection apparatus according to an embodiment of the present disclosure.

FIG. 3 is a diagram showing the pressure measuring element 140 of the battery swelling inspection apparatus 100 according to an embodiment of the present disclosure.

Referring to FIG. 3, the pressure measuring element 140 may include a head 141 and a body 142. In addition, the pressure measuring element 140 may be configured to measure a pressure applied to the head 141. For example, a load cell may be applied as the pressure measuring element 140.

Specifically, if swelling occurs in the battery cell 10, a swelling pressure may be applied to the head 141 of each of the plurality of pressure measuring elements 140. Each of the plurality of pressure measuring elements 140 may measure the swelling pressure applied to the head 141. In this case, since the plurality of pressure measuring elements 140 do not affect each other during the process of measuring pressure, the swelling pressures measured by the plurality of pressure measuring elements 140 differs from each other according to locations where swelling occurs in the battery cell 10.

The pressing member 150 may be provided in plural. Preferably, the number of the pressing members 150 may correspond to the number of the plurality of pressure measuring elements 140.

The pressing member 150 may be configured such that an upper surface thereof is formed in a flat shape and the upper surface thereof faces the upper plate 120.

Specifically, the battery cell 10 may be interposed between the pressing member 150 and the upper plate 120. The upper surface of the pressing member 150 may be formed in a flat shape so that the swelling pressure of the battery cell 10 may be applied to the pressing member 150 when the upper surface of the pressing member 150 contacts the battery cell 10.

For example, in the embodiment of FIG. 2, the battery cell 10 may be interposed and fixed between the upper surface of the pressing member 150 and the upper plate 120.

The pressing member 150 may be configured such that at least a portion of the lower surface thereof is attached to the head 141 of each of the plurality of pressure measuring elements 140.

For example, the head 141 of the pressure measuring element 140 and the pressing member 150 may be made of magnetic materials that may be attached to each other. More preferably, an upper end of the head 141 of the pressure measuring element 140 and a center portion of the lower surface of the pressing member 150 may be made of magnetic materials. Accordingly, by magnetism, the center portion of the lower surface of the pressing member 150 may be attached to the upper end of the head 141 of the pressure measuring element 140. In addition, the pressing member 150 may be attached to and detached from the head 141 of the pressure measuring element 140.

Figure 4:
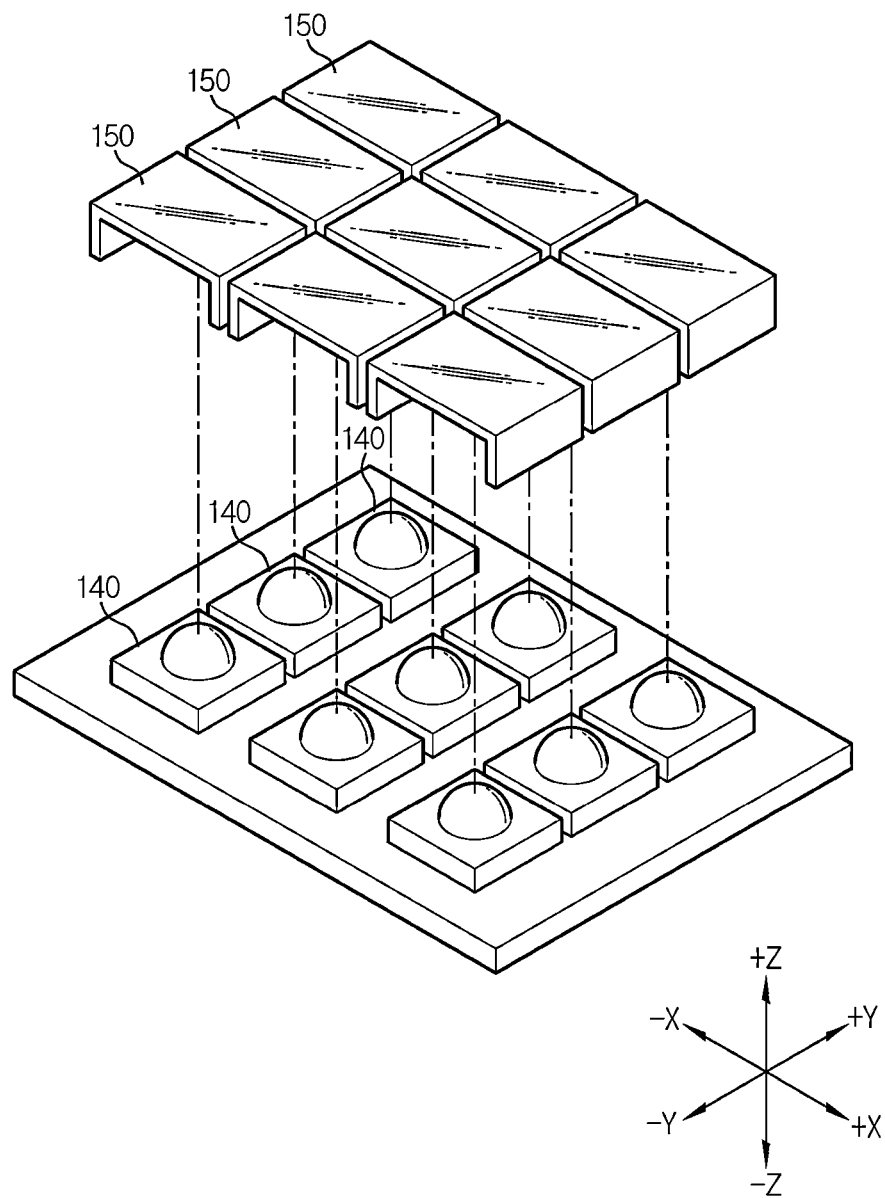
FIG. 4 is an exploded perspective view showing a pressure measuring element and a pressing member, in the battery swelling inspection apparatus according to an embodiment of the present disclosure.
Figure 5:
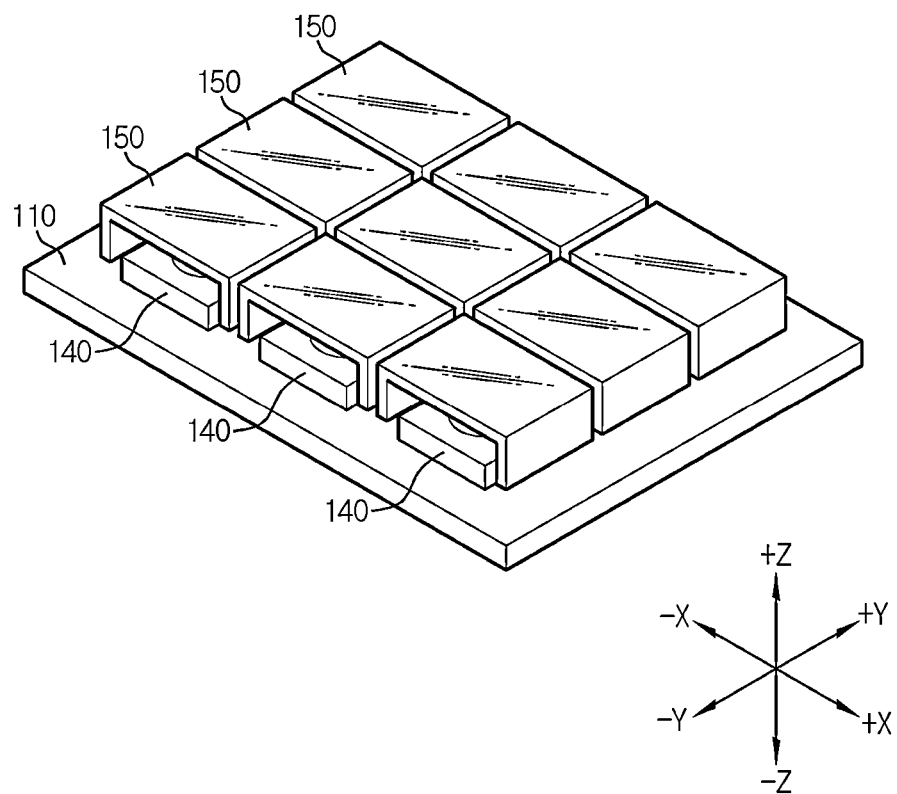
FIG. 5 is an assembled perspective view showing the pressure measuring element and the pressing member, in the battery swelling inspection apparatus according to an embodiment of the present disclosure.

FIG. 4 is an exploded perspective view showing the pressure measuring element 140 and the pressing member 150, in the battery swelling inspection apparatus 100 according to an embodiment of the present disclosure. FIG. 5 is an assembled perspective view showing the pressure measuring element 140 and the pressing member 150, in the battery swelling inspection apparatus 100 according to an embodiment of the present disclosure.

Referring to FIGS. 4 and 5, the plurality of pressing members 150 may be attached to the corresponding pressure measuring elements 140. That is, the plurality of pressing members 150 and the plurality of pressure measuring elements 140 may correspond to each other in one-to-one relationship.

For example, the center portion of the lower surface (a surface in −z direction) of the pressing member 150 may be attached to the upper end (the upper end in the +z direction) of the head 141. Preferably, the pressing member 150 may be attached to the head 141 of the pressure measuring element 140 such that the upper surface (a surface in +z direction) thereof is parallel to the lower plate 110.

In addition, referring to FIG. 5, the plurality of pressing members 150 may be spaced apart from each other by a predetermined distance.

For example, it is assumed that a first pressing member 150 corresponds to a first pressure measuring element 140a and a second pressing member 150 corresponds to a second pressure measuring element 140b. If the swelling pressure of the battery is applied to the first pressing member 150, the first pressing member 150 may transmit the swelling pressure to the head 141 of the first pressure measuring element 140a. That is, pressure in a lower direction (−z direction) is applied to the first pressing member 150 by the swelling pressure, and the swelling pressure may be transmitted to the head 141 of the first pressure measuring element 140a through the first pressing member 150. Since the first pressing member 150 and the second pressing member 150 are separated by a predetermined distance and do not contact each other, the swelling pressure applied to the first pressing member 150 may not have a direct effect on the second pressing member 150.

The pressure measuring element 140 may be configured such that at least a portion of the head 141 is inclined.

Specifically, if a swelling pressure is applied to the pressing member 150, the pressing member 150 may be pressed by the applied swelling pressure. In addition, the pressing member 150 may be inclined to correspond to the location where the swelling pressure is applied.

For example, if the swelling pressure is applied at a location outside the center portion of the pressing member 150, the pressing member 150 may be inclined based on the upper end of the head 141. That is, the center portion of the lower surface of the pressing member 150 (the portion attached to the upper end of the head 141) may act as a supporting point.

Referring to FIG. 5, the body 142 of the pressure measuring element 140 is fixedly coupled to the lower plate 110, and the head 141 of the pressure measuring element 140 is movable in a vertical direction. For example, in FIG. 5, the head 141 may move in an upper direction (+z direction) and a lower direction (−z direction). Therefore, as in the previous example, a portion of the upper end of the head 141 (the upper end in the +z direction) of the pressure measuring element 140 to which the pressing member 150 is attached may be configured in an inclined shape so that the force applied to the pressing member 150 may be transmitted to the head 141 of the pressure measuring element 140 in a better way while the pressing member 150 is being inclined.

For example, at least a portion of the head 141 of the pressure measuring element 140 may have an angular shape or a curved shape. Preferably, in the pressure measuring element 140, at least a portion of the head 141 may be configured to have a curved surface.

Therefore, when the pressing member 150 is inclined as the swelling pressure is applied to the pressing member 150, it is possible to minimize that the movement of the pressing member 150 is restricted by the shape of the head 141 of the pressure measuring element 140. That is, since the head 141 of the pressure measuring element 140 is configured such that the pressing member 150 may be easily inclined, the pressing member 150 may be easily inclined in response to the applied pressure.

In addition, since the body portion 151 of the pressing member 150 and the upper end of the head 141 of the pressure measuring element 140 are made of magnetic materials, the pressing member 150 may be configured to easily return to its original shape after being inclined.

Figure 6:
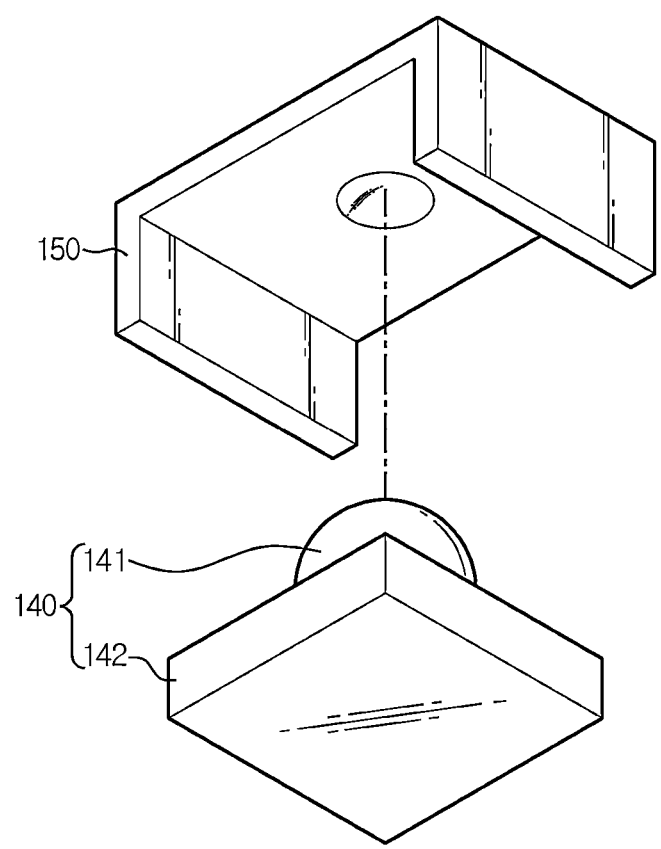
FIG. 6 is a diagram showing another embodiment of the pressing member, in the battery swelling inspection apparatus according to an embodiment of the present disclosure.

FIG. 6 is a diagram showing another embodiment of the pressing member 150, in the battery swelling inspection apparatus 100 according to an embodiment of the present disclosure.

Referring to FIG. 6, a groove corresponding to the head 141 of the pressure measuring element 140 may be provided in the center portion of the lower surface of the pressing member 150. Preferably, the curvature of the groove in the lower surface of the pressing member 150 may be less than or equal to the curvature of the upper end of the head 141 of the pressure measuring element 140.

For example, the groove of the lower surface of the pressing member 150 and the upper end of the head 141 of the pressure measuring element 140 may be magnetically attached to each other. In addition, if the swelling pressure is applied to the pressing member 150, the pressing member 150 may be easily inclined along the head 141 of the pressure measuring element 140.

Figure 7:
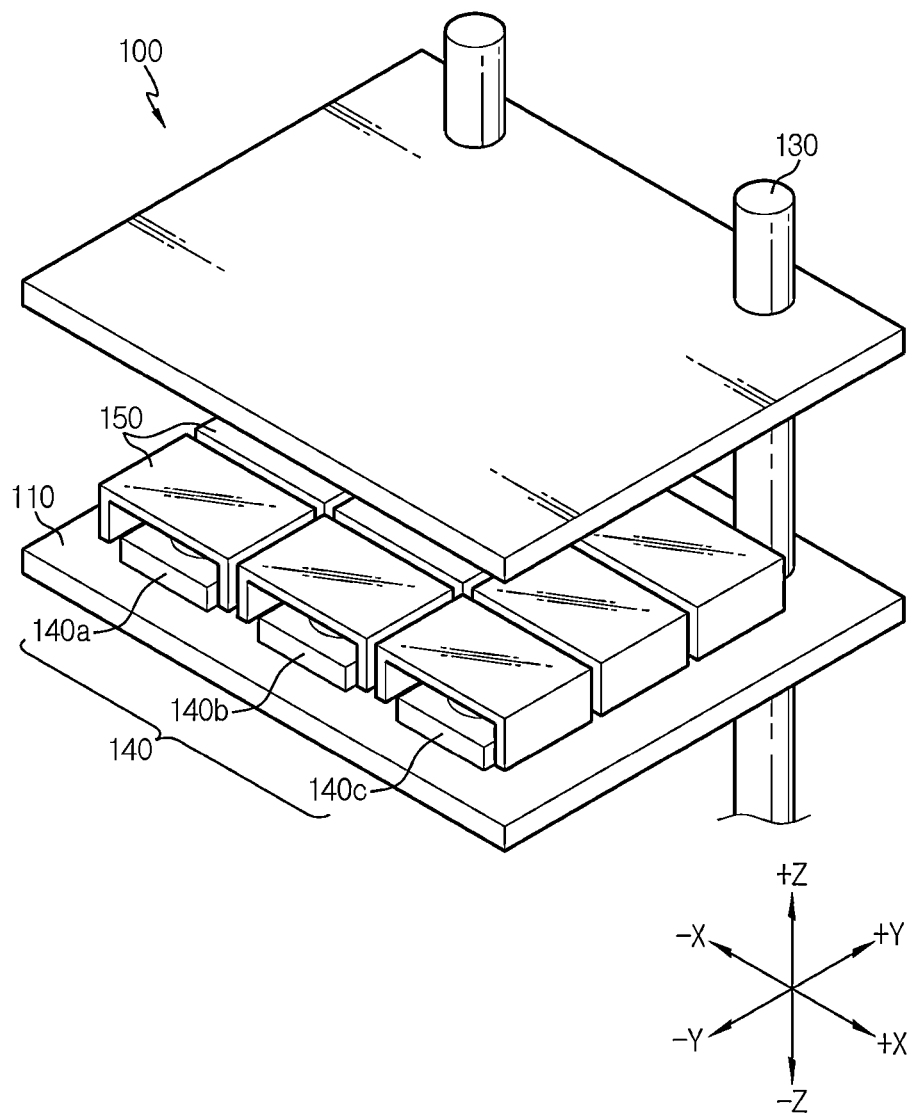
FIG. 7 is a diagram schematically showing the battery swelling inspection apparatus according to an embodiment of the present disclosure.

FIG. 7 is a diagram schematically showing the battery swelling inspection apparatus according 100 to an embodiment of the present disclosure.

Referring to FIG. 7, the pressing member 150 may be configured such that the upper surface thereof faces the upper plate 120 at a predetermined interval.

To this end, the fixing frame 130 may be configured to adjust the interval between the upper surface of the pressing member and the upper plate 120.

Specifically, the fixing frame 130 may be configured to adjust a location where the lower plate 110 and the upper plate 120 are coupled. Preferably, the location in the fixing frame 130 at which the lower plate 110 and the upper plate 120 are fixedly coupled may be adjusted so that the battery cell 10 may be fixed between the pressing member 150 and the upper plate 120. Accordingly, the interval between the upper surface of the pressing member 150 and the lower surface of the upper plate 120 may be adjusted.

For example, in the embodiment of FIG. 7, the fixing frame 130 may be configured to adjust the position where which the lower plate 110 and the upper plate 120 are fixed in a vertical direction (z direction).

If the interval between the upper surface of the pressing member 150 and the lower surface of the upper plate 120 is not adjustable, there is a problem that the type of the battery cell 10 to be inspected is limited.

Therefore, since the battery swelling inspection apparatus 100 according to an embodiment of the present disclosure includes the fixing frame 130 configured to adjust the interval between the lower plate 110 and the upper plate 120, and there is an advantage in that swelling of battery cells 10 having various thicknesses (for example, z-direction length of the battery cell 10 in FIG. 7) may be inspected.

Figure 8:
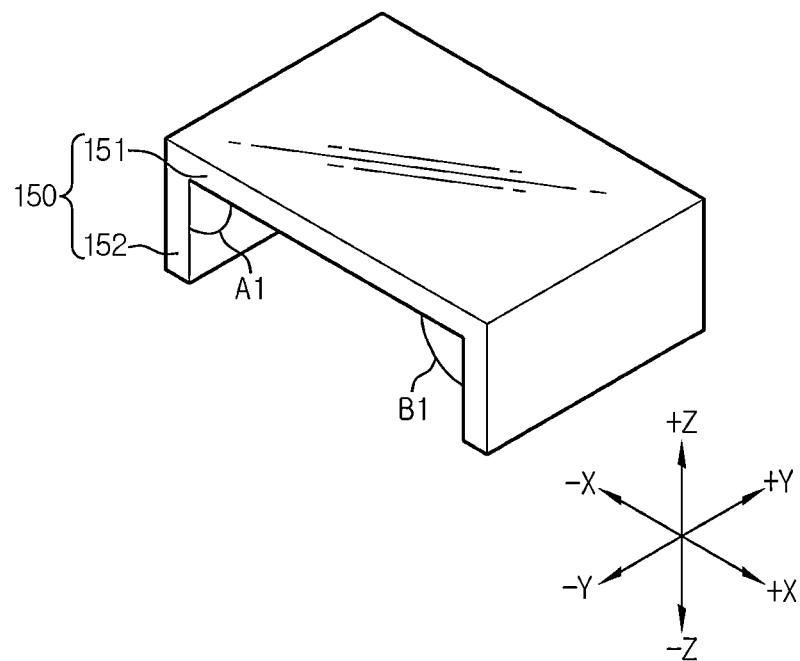
FIG. 8 is a diagram showing another embodiment of the pressing member, in the battery swelling inspection apparatus according to an embodiment of the present disclosure.

FIG. 8 is a diagram showing another embodiment of the pressing member 150, in the battery swelling inspection apparatus 100 according to an embodiment of the present disclosure.

The pressing member 150 may include a body portion 151 and a leg portion 152.

The body portion 151 may be configured in a plate shape having the upper surface and the lower surface. In addition, the leg portion 152 may be configured to protrude in a lower direction from at least a portion of the body portion 151.

For example, in the embodiment of FIG. 8, the body portion 151 may be configured in a plate shape having an upper surface (a surface in +z direction) and a lower surface (a surface in −z direction). In addition, the leg portion 152 may protrude in a lower direction (−z direction) from a portion of the body portion 151.

For example, if the inclined pressing member 150 and the pressing member 150 adjacent thereto contact each other, the swelling pressure of the battery cell 10 may not be accurately transmitted to the pressure measuring element 140 corresponding to the inclined pressing member 150. In this case, the accuracy of the swelling distribution of the battery cell 10 inspected by the plurality of pressure measuring elements 140 may be lowered. Accordingly, the plurality of pressure measuring elements 140 may be disposed on the lower plate 110 with a predetermined interval therebetween so that any one pressing member 150 does not contact the adjacent pressing member 150 even though rotating.

Preferably, the pressing member 150 may be configured such that an angle between the body portion 151 and the leg portion 152 is changeable.

Figure 9:
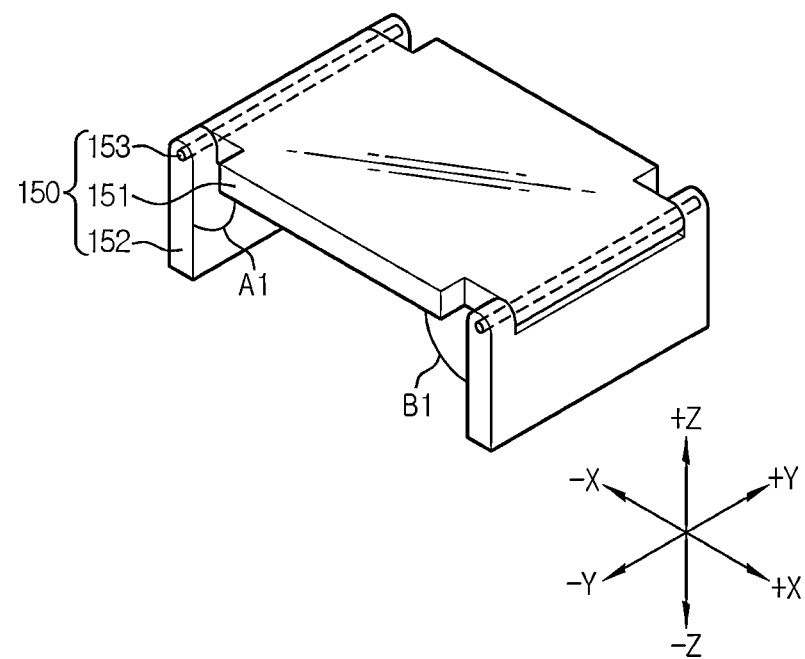
FIG. 9 is a diagram more specifically showing the pressing member, in the battery swelling inspection apparatus according to an embodiment of the present disclosure.
Figure 10:
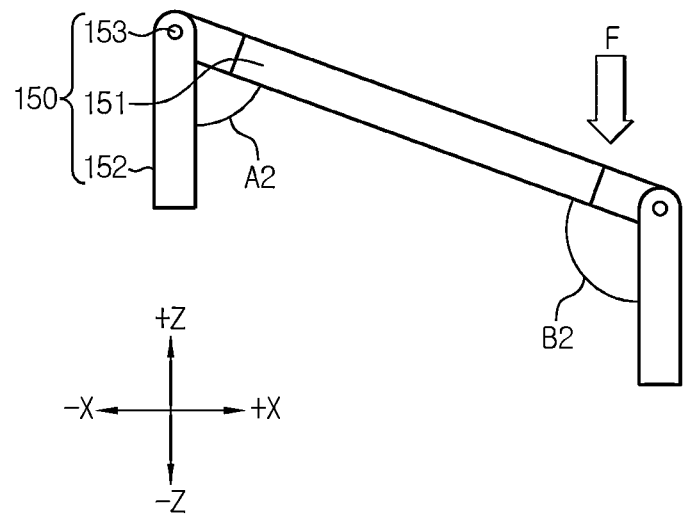
FIG. 10 is a diagram showing an embodiment in which the pressing member is inclined, in the battery swelling inspection apparatus according to an embodiment of the present disclosure.

FIG. 9 is a diagram more specifically showing the pressing member 150, in the battery swelling inspection apparatus 100 according to an embodiment of the present disclosure. FIG. 10 is a diagram showing an embodiment in which the pressing member 150 is inclined, in the battery swelling inspection apparatus 100 according to an embodiment of the present disclosure.

Specifically, FIG. 9 is an embodiment in which the pressing member 150 is not inclined, and FIG. 10 is an embodiment in which the pressing member 150 is inclined by the swelling pressure F.

Referring to FIG. 9, before the pressing member 150 is inclined, the angles between the body portion 151 and the leg portions 152 may be A1° and B1°. In addition, referring to FIG. 10, if the swelling pressure F is applied to the pressing member 150 so that the pressing member 150 is rotated, the angles between the body portion 151 and the leg portions 152 may be changed to A2° and B2°.

Specifically, the leg portion 152 may be coupled to at least a portion of the body portion 151 and configured to enable hinge rotation at the coupled point.

That is, the leg portion 152 and the body portion 151 may be coupled to each other through a hinge pin 153. In addition, the leg portion 152 and the body portion 151 may be rotatably coupled based on the hinge pin 153 as an axis. Thus, even if the body portion 151 of the pressing member 150 is inclined, the leg portion 152 may face the lower direction (−z direction).

Referring to FIG. 7 again, since the leg portion 152 and the body portion 151 are configured to enable hinge rotation, even if the body portions 151 of some of the plurality of pressing members 150 are inclined, the leg portions 152 of the plurality of pressing members 150 may not contact each other. That is, since the leg portion 152 of the pressing member 150 may always face the lower direction (−z direction), the intervals of the plurality of pressing members disposed on the lower plate 110 may be set narrower.

Therefore, the battery swelling inspection apparatus 100 according to an embodiment of the present disclosure may more accurately inspect the swelling distribution and/or the swelling degree of the battery cell 10 by arranging a larger number of pressurizing members on the lower plate 110.

Figure 11:
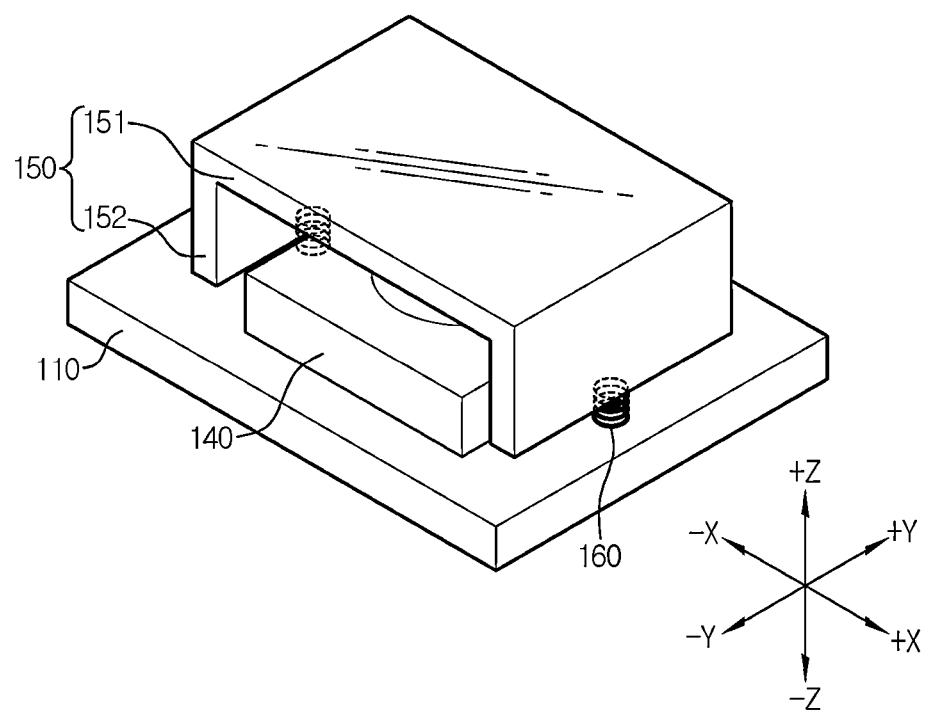
FIG. 11 is a diagram schematically showing an embodiment where an elastic member is further included in the battery swelling inspection apparatus according to an embodiment of the present disclosure.

FIG. 11 is a diagram schematically showing an embodiment where an elastic member 160 is further included in the battery swelling inspection apparatus 100 according to an embodiment of the present disclosure. Specifically, FIG. 11 is a diagram schematically showing only one pressure measuring element 140, one pressing member 150 and one elastic member 160 in the battery swelling inspection apparatus 100. However, it should be noted that the structure of FIG. 11 may also be applied to the embodiment of FIG. 7.

Referring to FIG. 11, the battery swelling inspection apparatus 100 according to an embodiment of the present disclosure may further include an elastic member 160.

The elastic member 160 may be configured to have one end attached to the lower plate 110 and the other end attached to the leg portion 152.

More specifically, the body portion 151 may be configured to be inclined based on the head 141 to correspond to a location where the pressure is applied. That is, the body portion 151 may be rotated based on the head 141 so as to correspond to a location where the pressure is applied.

In addition, the leg portion 152 is configured to be movable in the upper direction (+z direction) or the lower direction (−z direction) by the elastic member 160 that contracts or expands depending on the degree of inclination of the body portion 151.

For example, if the pressing member 150 remains inclined as in the embodiment of FIG. 10 even after the swelling pressure is temporarily applied, the swelling pressure applied thereafter may not be accurately transmitted to the pressure measuring element 140 through the pressing member 150.

Meanwhile, referring to FIG. 11, if the swelling pressure is applied to the pressing member 150 so that the body portion 151 is inclined, the elastic member 160 may contract or expand accordingly. In addition, if the swelling pressure disappears, the pressing member 150 inclined by the elastic force of the elastic member 160 may be easily returned to its original position.

Therefore, since the battery swelling inspection apparatus 100 further includes the elastic member 160 that connects the lower plate 110 and the pressing member 150, when the swelling pressure applied to the pressing member 150 disappears, the pressing member 150 may be easily returned to its original state. Through this, during the swelling inspection process in which the battery cell 10 is charged and discharged several times, the swelling distribution and/or the swelling degree of the battery cell 10 may be more accurately inspected.

Figure 12:
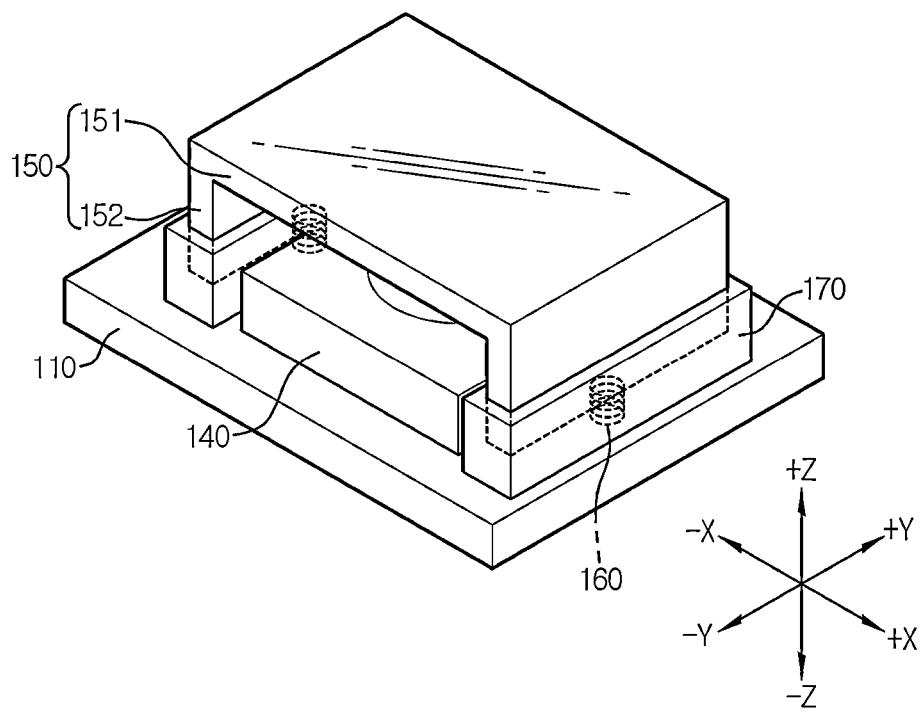
FIGS. 12 to 14 are diagrams schematically showing an embodiment where a support member is further included in the battery swelling inspection apparatus according to an embodiment of the present disclosure.
Figure 13:
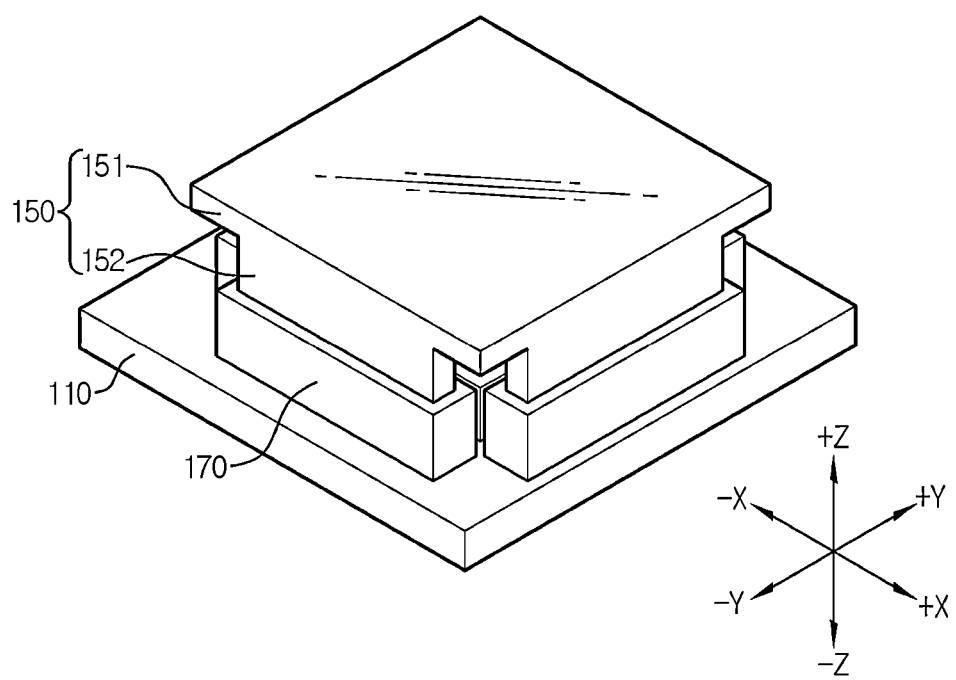
Figure 14:
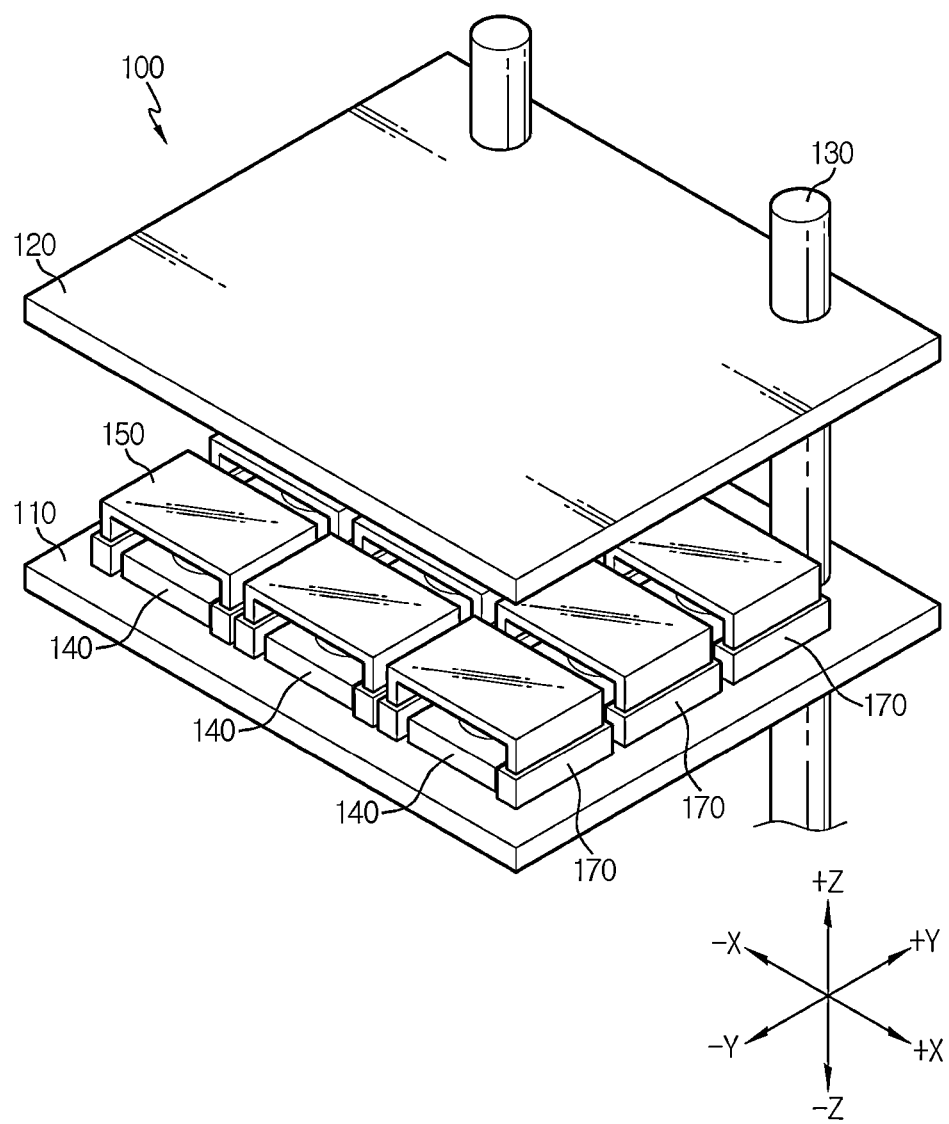

FIGS. 12 to 14 are diagrams schematically showing an embodiment where a support member 170 is further included in the battery swelling inspection apparatus according to an embodiment of the present disclosure.

Specifically, FIGS. 12 and 13 are diagrams schematically showing only one pressure measuring element 140, one pressing member 150, the elastic member 160 and support member 170 in the battery swelling inspection apparatus 100.

More specifically, FIG. 12 shows an embodiment in which two leg portions 152 are provided in the pressing member 150 and two support members 170 are provided. FIG. 13 shows an embodiment in which four leg portions 152 are provided in the pressing member 150 and four support members 170 are provided.

In addition, FIG. 14 is a diagram showing an embodiment of the battery swelling inspection apparatus 100 in which two leg portions 152 are provided in each of the plurality of pressing members 150 and each leg portion 152 is inserted into the support member 170.

Referring to FIGS. 12 to 14, the battery swelling inspection apparatus 100 according to an embodiment of the present disclosure may further include a support member 170.

One end of the support member 170 may be attached to the lower plate 110, and a hollow or a groove may be formed in the support member 170 so that the leg portion 152 is inserted therein.

Since the leg portion 152 is inserted into the support member 170 and the leg portion 152 may only move inside the support member 170, even if the body portion 151 of the pressing member 150 rotates, it is possible to prevent the adjacent leg portions 152 from contacting each other.

Since the battery swelling inspection apparatus 100 according to an embodiment of the present disclosure further includes the support member 170, the interval of the plurality of pressure measuring elements 140 disposed on the lower plate 110 (specifically, the interval between the plurality of pressing members 150) may be set narrower. Accordingly, the number of pressure measuring elements 140 that may be disposed on the lower plate 110 may be increased, and thus the swelling distribution and/or the swelling degree of the battery cell 10 may be more accurately inspected.

Preferably, the elastic member 160 may be configured to be located inside the hollow or the groove.

For example, in the embodiment of FIG. 12, the hollow may be formed inside the support member 170. In addition, the elastic member 160 may be provided inside the hollow of the support member 170 so that one end thereof is attached to the upper surface (a surface in +z direction) of the lower plate 110 and the other end thereof is attached to the lower surface (a surface in −z direction) of the leg portion 152 inserted into the hollow.

As another example, the groove may be formed inside the support member 170. In this case, the elastic member 160 may be seated in the groove of the support member 170 so that one end thereof is attached to the upper surface (a surface in +z direction) of the groove of the support member 170 and the other end thereof is attached to the lower surface (a surface in −z direction) of the leg portion 152 inserted into the groove.

That is, since the battery swelling inspection apparatus 100 according to an embodiment of the present disclosure further includes the support member 170 for preventing the adjacent pressing members 150 from contacting, it is possible to improve the accuracy of the swelling pressure measured by each of the plurality of pressure measuring elements 140.

In addition, since the battery swelling inspection apparatus 100 includes the elastic member 160 inside the support member 170, the body portion 151 of the pressing member 150 may be more easily returned to its original position after being rotated.

Figure 15:
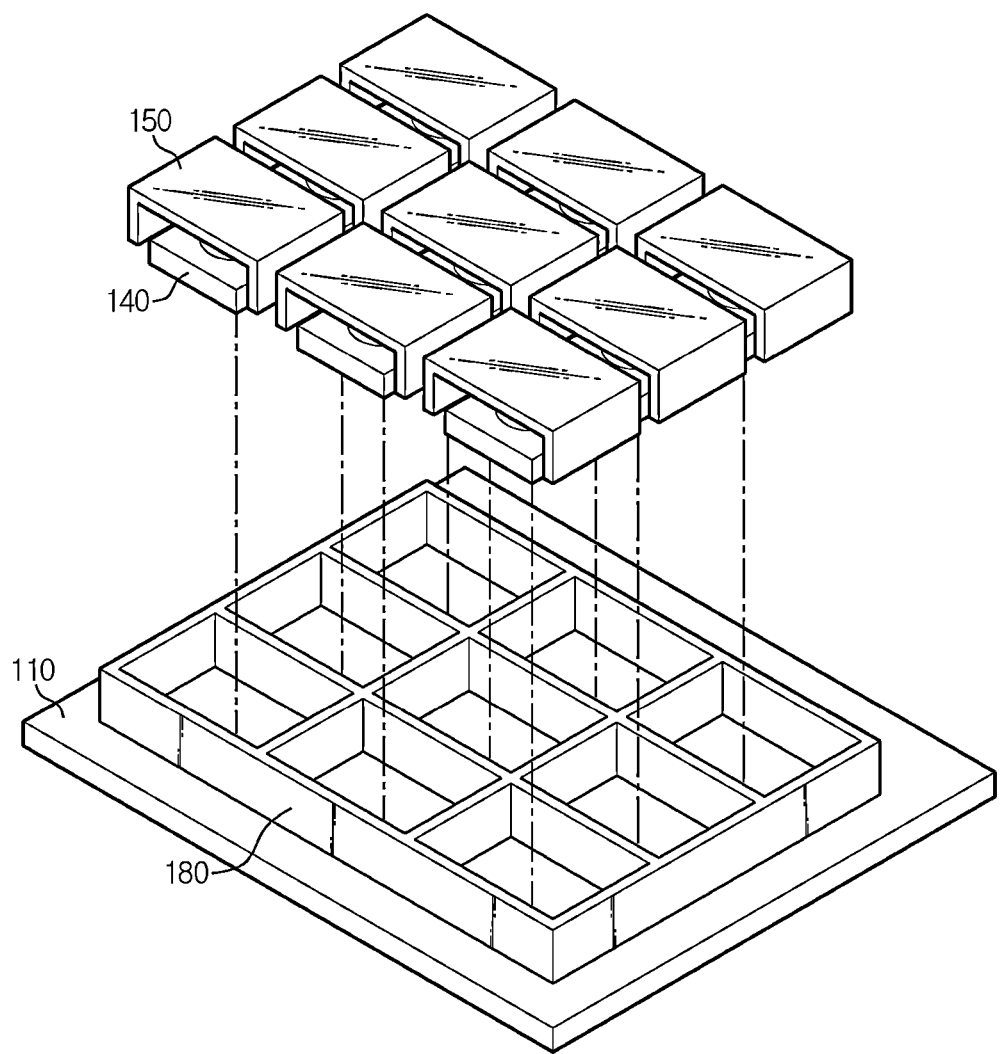
FIGS. 15 and 16 are diagrams schematically showing an embodiment where a guide member is further included in the battery swelling inspection apparatus according to an embodiment of the present disclosure.
Figure 16:
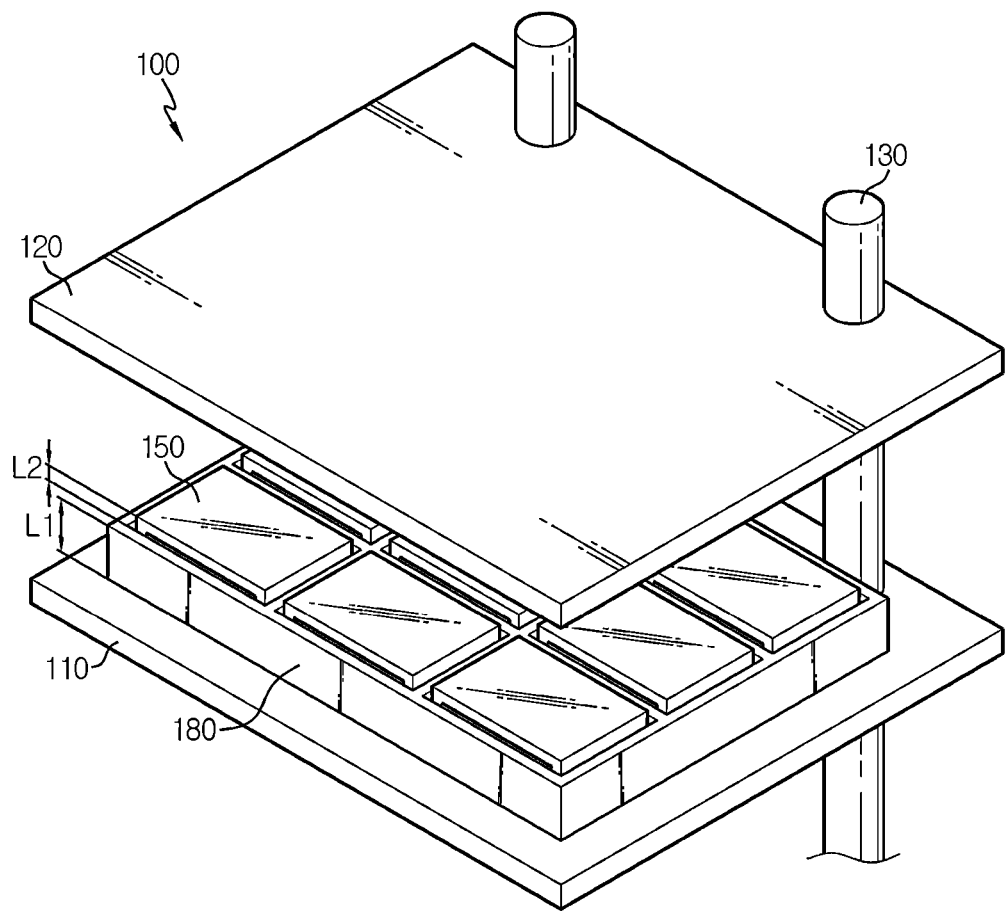

FIGS. 15 and 16 are diagrams schematically showing an embodiment where a guide member 180 is further included in the battery swelling inspection apparatus 100 according to an embodiment of the present disclosure.

Referring to FIGS. 15 and 16, the battery swelling inspection apparatus 100 according to an embodiment of the present disclosure may further include a guide member 180.

The guide member 180 may be configured to protrude in an upper direction (+z direction) from the upper surface of the lower plate 110 so as to divide the upper surface (the surface in +z direction) of the lower plate 110 into a plurality of sections.

The guide member 180 may be configured integrally with the lower plate 110 or may be configured separately from the lower plate 110 and attached to the lower plate 110. For example, FIGS. 15 and 16 show an embodiment in which the guide member 180 and the lower plate 110 may be configured individually and the guide member 180 may be attached to the lower plate 110.

Referring to FIGS. 15 and 16, the upper surface of the lower plate 110 may be divided into a plurality of sections by the guide member 180. In addition, the pressure measuring element 140 and the pressing member 150 may be provided in each section. In addition, referring to various embodiments above, at least one of the elastic member 160 and the support member 170 may be further provided in each section.

Since the battery swelling inspection apparatus 100 according to an embodiment of the present disclosure further includes the guide member 180, it is possible to prevent the plurality of pressing members 150 from contacting in advance.

Meanwhile, if the swelling degree of the battery cell 10 is so severe to change the volume change of the battery cell 10 greatly, the deformation force of the elastic member 160 may exceed an elastic limit. That is, if the body portion 151 of the pressing member 150 is excessively rotated, some of the elastic members 160 may expand to exceed the elastic limit. In this case, the elastic member 160 expanded to exceed the elastic limit may undergo plastic deformation. Therefore, there is a problem in that the swelling distribution and/or the swelling degree of the battery cell 10 may no longer be accurately measured using the elastic member 160.

For example, in the embodiment of FIG. 16, the upper surface of the pressing member 150 may protrude by a predetermined length L2 from the upper surface of the guide member 180. In addition, if swelling occurs in the battery cell 10, the volume of the battery cell 10 may increase to press the pressing member 150. Here, since the upper plate 120 and the lower plate 110 are fixed not to be shaken or rotated by the fixing frame 130, a swelling pressure may be applied to the pressing member 150 as much as the increased volume of the battery cell 10.

In order to prevent this problem in advance, the height L1 of the guide member 180 may be determined in consideration of the elastic limit of the elastic member 160.

That is, since the guide member 180 prevents the volume of the battery cell 10 from increasing above a certain level, it is possible to prevent the pressing member 150 from being excessively rotated in one direction and expanding the elastic member 160 to exceed the elastic limit.

Preferably, the height of the guide member 180 may be determined in consideration of the elastic limit of the elastic member 160 and the height (L1+L2) from the upper surface of the lower plate 110 to the upper surface of the pressing member 150.

More preferably, the height of the guide member 180 may be determined in comprehensive consideration of the elastic limit of the elastic member 160, the height (L1+L2) from the upper surface of the lower plate 110 to the upper surface of the pressing member 150, and the maximum degree of expansion of the battery cell 10.

Therefore, the battery swelling inspection apparatus 100 according to an embodiment of the present disclosure has an advantage of preventing damage to the elastic member 160, thereby reducing maintenance and repair costs of the inspection apparatus.

In addition, the battery swelling inspection apparatus 100 has an advantage of more accurately inspecting the swelling distribution and/or the swelling degree of the battery cell 10, since the possibility of damage to the elastic member 160 may be dramatically reduced.

Referring to FIG. 1, the battery swelling inspection apparatus 100 according to an embodiment of the present disclosure may further include a control unit 190.

Here, the control unit 190 may selectively include processors known in the art, application-specific integrated circuit (ASIC), other chipsets, logic circuits, registers, communication modems, data processing devices, and the like to execute various control logic performed in the present disclosure. Also, when the control logic is implemented in software, the control unit 190 may be implemented as a set of program modules. At this time, the program module may be stored in a memory and executed by the control unit 190. The memory may be located inside or out of the control unit 190 and may be connected to the control unit 190 by various well-known means.

The control unit 190 is connected to the plurality of pressure measuring elements 140 and may be configured to receive a measured pressure value from each of the plurality of pressure measuring elements 140.

For example, the control unit 190 may be communicatively connected to the plurality of pressure measuring elements 140 through wired communication. In addition, the control unit 190 may receive the measured pressure value from the plurality of pressure measuring elements 140. That is, the control unit 190 may receive the swelling pressure value of the battery cell 10 measured by each of the plurality of pressure measuring elements 140.

In addition, if the battery cell 10 is interposed between the upper plate 120 and the pressing member 150, the control unit 190 may be configured to determine at least one of the swelling distribution of the battery cell 10 and the swelling degree of each region of the battery cell 10 based on the plurality of received pressure values.

For example, in the embodiment of FIG. 7, the first pressure measuring element 140a may measure the pressure value of the first region of the battery cell 10. In addition, the second pressure measuring element 140b may measure the pressure value of the second region of the battery cell 10, and the third pressure measuring element 140c may measure the pressure value of the third region of the battery cell 10. Hereinafter, the present disclosure will be described based on the embodiment of FIG. 7, but it should be noted that the following feature may be applied identically to the embodiments of FIGS. 14 and 16.

The control unit 190 may receive a first pressure value from the first pressure measuring element 140a. In addition, the control unit 190 may receive a second pressure value from the second pressure measuring element 140b and receive a third pressure value from the third pressure measuring element 140c.

The control unit 190 may determine a swelling distribution for the first region, the second region and the third region of the battery cell 10 based on the first pressure value, the second pressure value and the third pressure value, respectively.

In addition, the control unit 190 may calculate a first pressure difference value between the first pressure value and a reference pressure value, calculate a second pressure difference value between the second pressure value and the reference pressure value, and calculate a third pressure difference value between the third pressure value and the reference pressure value.

The control unit 190 may determine the swelling degree for each of the first region, the second region and the third region of the battery cell 10 by matching the first pressure difference value, the second pressure difference value and the third pressure difference value with a plurality of preset pressure sections.

Here, the plurality of pressure sections may be set in advance as a normal section, a warning section and a danger section. In addition, the plurality of pressure sections may be stored in an internal memory of the control unit 190 or an external memory.

For example, it is assumed that among the plurality of pressure sections, the first pressure difference value belongs to the danger section, the second pressure difference value belongs to the warning section, and the third pressure difference value belongs to the normal section. The control unit 190 may determine that the swelling degree of the first region of the battery cell 10 is the danger level, the swelling degree of the second region is the warning level, and the swelling degree of the third region is the normal level.

More preferably, the control unit 190 may be configured to determine the swelling distribution of each region of the battery cell 10 first and then determine the swelling degree of only the region of the battery cell 10 that is determined to have swelling.

In the former embodiment, it is assumed that the control unit 190 determines that swelling occurs in the first region and the second region of the battery cell 10. The control unit 190 may determine the swelling degree for the first region by matching the first pressure difference value for the first region of the battery cell 10 with the plurality of preset pressure sections. In addition, the control unit 190 may determine the swelling degree for the second region of the battery cell 10 by matching the second pressure difference value for the second region of the battery cell 10 with the plurality of preset pressure sections. Here, the control unit 190 may compare the sizes of the plurality of received pressure values and the reference pressure value, and determine that swelling occurs if the received pressure value is greater than or equal to the reference pressure value.

That is, the battery swelling inspection apparatus 100 according to another embodiment of the present disclosure may determine the swelling distribution of the battery cell 10 and/or the swelling degree of each region of the battery cell 10. Accordingly, a region in which swelling occurs in the battery cell 10 may be specifically specified.

In addition, since the battery swelling inspection apparatus 100 may specifically determine the swelling degree of each region of the battery cell 10, there is an advantage of providing information for analyzing the cause of the swelling of the battery cell 10.

For example, based on the swelling distribution of the battery cell 10 and the swelling degree of each region obtained from the battery swelling inspection apparatus 100, it is possible to distinguish whether the swelling is caused by an increase in pressure due to gas generation or an increase in pressure due to inflow of foreign substances.

Figure 17:
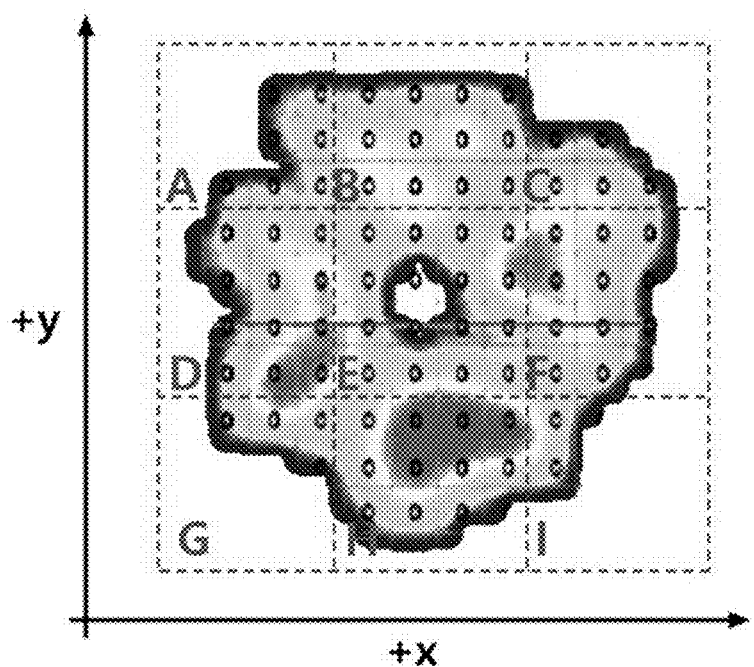
FIG. 17 is a diagram schematically showing a swelling inspection result of a battery cell using the battery swelling inspection apparatus according to an embodiment of the present disclosure.

FIG. 17 is a diagram schematically showing a swelling inspection result of a battery cell 10 using the battery swelling inspection apparatus 100 according to an embodiment of the present disclosure.

Referring to the swelling distribution of the battery cell 10 illustrated in FIG. 17, it may be determined that the degree of swelling is most severe in a region in the −y direction among regions (A to I) of the battery cell 10 divided into nine. That is, in the embodiment of FIG. 7, it may be seen that swelling occurs most severely in the region H of the battery cell 10 corresponding to the second pressure measuring element 140*b* among three pressure measuring elements 140 located in the −y direction.

As described above, the battery swelling inspection apparatus 100 according to an embodiment of the present disclosure may check a region of the battery cell 10 where swelling occurs most severely by using the swelling distribution of each region of the battery cell 10.

The embodiments of the present disclosure described above may not be implemented only through an apparatus and a method, but may be implemented through a program that realizes a function corresponding to the configuration of the embodiments of the present disclosure or a recording medium on which the program is recorded. The program or recording medium may be easily implemented by those skilled in the art from the above description of the embodiments.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Additionally, many substitutions, modifications and changes may be made to the present disclosure described hereinabove by those skilled in the art without departing from the technical aspects of the present disclosure, and the present disclosure is not limited to the above-described embodiments and the accompanying drawings, and each embodiment may be selectively combined in part or in whole to allow various modifications.

REFERENCE SIGNS

10: battery cell
100: battery swelling inspection apparatus
110: lower plate
120: upper plate
130: fixing frame
140: pressure measuring element
140*a*: first pressure measuring element
140*b*: second pressure measuring element
140*c*: third pressure measuring element
141: head
142: body
150: pressing member
151: body portion
152: leg portion
153: hinge pin
160: elastic member
170: support member
180: guide member
190: control unit

What is claimed is:

1. A battery swelling inspection apparatus, comprising:
a first plate configured in a plate shape;
a second plate configured in a plate shape and located to face the first plate;
a fixing frame configured such that a portion of the first plate and a portion of the second plate are fixedly coupled thereto;
a plurality of pressure measuring elements fixedly coupled to the first plate, having a head located to face the second plate, and configured to measure a pressure applied to the head, respectively; and
a plurality of pressing members configured to have a second surface in a flat shape so that the second surface faces the second plate and have a first surface that is at least partially attached to the head of each of the plurality of pressure measuring elements,
wherein the plurality of pressing members are separated from each other by a predetermined distance and are not directly connected to each other.

2. The battery swelling inspection apparatus according to claim 1, wherein a pressure measuring element among the plurality of pressure measuring elements is configured such that at least a portion of the head is inclined relative to the first surface.

3. The battery swelling inspection apparatus according to claim 2, wherein a pressure measuring element among the plurality of pressure measuring elements is configured such that at least a portion of the head has a curved surface.

4. The battery swelling inspection apparatus according to claim 2, wherein a pressing member among the plurality of pressing members is configured such that a center portion of the first surface thereof is attached to the head.

5. The battery swelling inspection apparatus according to claim 1, wherein a pressing member among the plurality of pressing members is configured such that the second surface thereof faces the second plate at a predetermined interval.

6. The battery swelling inspection apparatus according to claim 5, wherein the fixing frame is configured such that the predetermined interval between the second surface of each pressing member and the second plate is adjustable.

7. The battery swelling inspection apparatus according to claim 1, wherein each pressing member includes:
a body portion configured in a plate shape having the second surface and the first surface; and
a leg portion configured to protrude in a first direction from at least a portion of the body portion.

8. The battery swelling inspection apparatus according to claim 7, wherein each pressing member is configured such that an angle between the body portion and the leg portion is changeable.

9. The battery swelling inspection apparatus according to claim 7, wherein the leg portion is coupled with at least a portion of the body portion and configured to enable hinge rotation where coupled.

10. The battery swelling inspection apparatus according to claim 7, further comprising:
an elastic member configured to have one end attached to the first plate and the other end attached to the leg portion.

11. The battery swelling inspection apparatus according to claim 10, wherein the body portion is configured to be inclinable based on the head to correspond to a location where a pressure is applied, and
wherein the leg portion is configured to be movable in a second direction or in a first direction by the elastic member that contracts or expands depending on a degree of inclination of the body portion.

12. The battery swelling inspection apparatus according to claim 10, further comprising:
a support member configured to have one end attached to the second plate and have a hollow or a groove so that the leg portion is inserted therein.

13. The battery swelling inspection apparatus according to claim 12, wherein the elastic member is configured to be located in the hollow or the groove.

14. The battery swelling inspection apparatus according to claim 1, further comprising:
a guide member configured to protrude in a first direction from a second surface of the first plate so that the second surface of the first plate is divided into a plurality of sections.

15. The battery swelling inspection apparatus according to claim 1, further comprising:
a controller connected to the plurality of pressure measuring elements and configured to receive a measured pressure value from each of the plurality of pressure measuring elements and, when a battery cell is interposed between the second plate and a pressing member among the plurality of pressing members, determine at least one of a swelling distribution of the battery cell and a swelling degree of each region of the battery cell based on the plurality of received pressure values.

16. The battery swelling inspection apparatus according to claim 1, wherein the head of each of the plurality of pressure measuring elements is hemispherical.

17. The battery swelling inspection apparatus according to claim 1, wherein a pressing member among the plurality of pressing members includes a magnetic material.

18. The battery swelling inspection apparatus according to claim 1, wherein the predetermined distance defines a space between the plurality of pressing members, and a connection unit is not interposed between the plurality of pressing members in the space.

* * * * *